United States Patent [19]

Vögeli

[11] 4,129,141
[45] Dec. 12, 1978

[54] SCRAM VALVE

[75] Inventor: Ernst Vögeli, Wiesendangen, Switzerland

[73] Assignee: Sulzer Brothers Ltd., Winterthur, Switzerland

[21] Appl. No.: 666,919

[22] Filed: Mar. 15, 1976

[30] Foreign Application Priority Data

Mar. 20, 1975 [CH] Switzerland .................. 3561/75

[51] Int. Cl.² .............................................. F16K 17/10
[52] U.S. Cl. .................................... 137/462; 137/488
[58] Field of Search ............................ 137/488, 462

[56] References Cited

U.S. PATENT DOCUMENTS

| 659,207 | 10/1900 | Cash | 137/487 |
|---|---|---|---|
| 3,376,893 | 4/1968 | McCombs, Jr. | 137/489.5 X |
| 3,589,390 | 6/1971 | Frantz | 137/489.5 |
| 3,800,822 | 4/1974 | Baker | 137/489.5 |

FOREIGN PATENT DOCUMENTS 154893 8/1932 Switzerland.

Primary Examiner—Arnold Rosenthal
Attorney, Agent, or Firm—Kenyon & Kenyon, Reilly, Carr & Chapin

[57] ABSTRACT

The scram valve has a closing piston which can be controlled by a pilot valve in a pressure medium supply line to the closing piston. The pilot valve has a control piston which is spring biased on one side and connected on the other side with the flow of medium in the outlet spigot of the scram valve. Thus, should the pressure in the outlet spigot drop, the control piston moves to open the pressure medium supply line to the closing piston. In addition, this supply line is connected at the upstream end to the scram valve casing upstream of the valve seat so that the pressure of the medium flowing through the scram valve aids in the closing of this valve.

8 Claims, 1 Drawing Figure

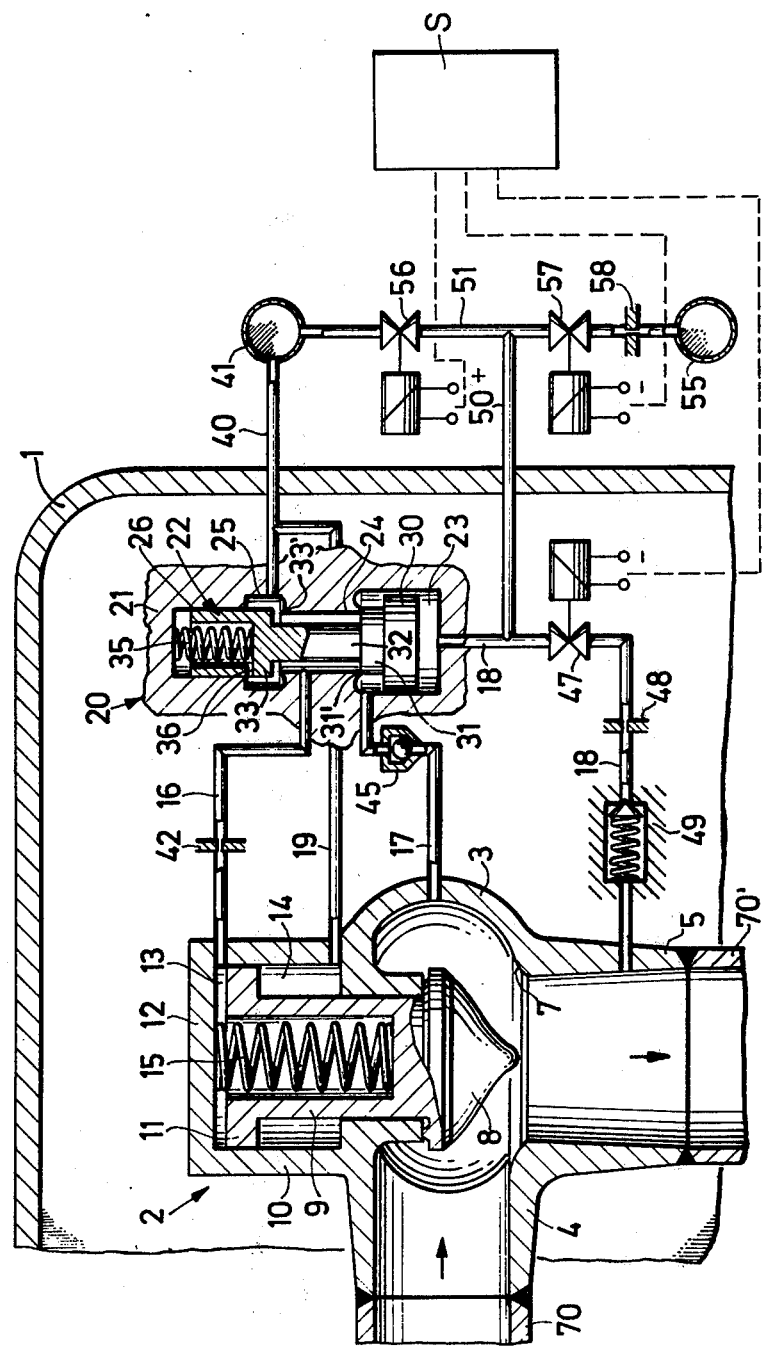

SCRAM VALVE

This invention relates to a scram valve and particularly to a steam shut-off valve for a nuclear reactor plant.

As is known, scram valves are generally constructed with a closing piston which can move in a cylinder and which is connected to a valve body. The cylinder, in turn, generally has one chamber which communicates with a pressure medium supply line during a closing movement of the piston while another cylinder chamber is connected to a chamber at a lower pressure. In order to close the valve, a pilot valve is provided in the pressure medium supply line. In known scram valves of this kind, the pilot valve is operated via measuring instruments and signal transducers in dependence upon the operating parameters under supervision. A delay therefore occurs between the time when the parameter under supervision exceeds a critical value and the time when the scram valve responds. Consequently, when the scram valve forms part of a nuclear reactor plant, there is a risk that, should a line rupture, such a delay may be responsible for considerable quantities of the medium flowing through the line entering the surrounding room; the medium possibly having been contaminated by short-life fission products.

Accordingly, it is an object of the invention to improve a scram valve of the kind described so as to have a reduced response time with a consequent improvement in safety.

It is another object of the invention to provide a scram valve which is of relatively simple construction.

It is another object of the invention to eliminate a need for measuring devices and signal transducers in order to operate a scram valve.

Briefly, the invention provides a scram valve which can be controlled by the pressure in the lines in which the scram valve is incorporated. To this end, the scram valve includes a casing having an inlet spigot, an outlet spigot for a flow of medium and a valve seat between the spigots. In addition, the valve has a lid on the casing which defines a cylindrical chamber and a closing piston head which is slidably mounted in the chamber and connected to a valve body, for seating on the valve seat to close the outlet spigot to the flow of medium. The piston head is disposed within the lid to sub-divide the chamber into a pair of sub-chambers. A pressure medium supply line is connected to one of the sub-chambers to deliver a pressure medium thereto for moving the valve body into closing relation with the outlet spigot while a low pressure chamber is connected to the other sub-chamber. A pilot valve is disposed in the pressure medium supply line for selectively opening and closing the supply line. This pilot valve has a control piston and means communicating one end of the control piston with a flow of medium in the casing near the outlet spigot.

During use, should a failure occur downstream of the valve with a resulting abrupt pressure decrease downstream of the valve seat of the valve, the control piston responds by moving into an opening position in the pressure medium supply line. This allows the pressure medium in the supply line to flow into the respective sub-chamber causing closing of the valve. The pilot valve is therefore acted upon directly, downstream of the valve seat, by the pressure of the medium flowing through the scram valve, i.e. there are no interposed sensors and/or signal transducers. Since a negative pressure wave travels at sonic speed towards the scram valve in the event a line ruptures, the scram valve response time is reduced considerably. Also, since the pressure acts directly on the pilot valve piston, the reliability of operation is improved. The absence of measuring devices and signal transducers further reduces the risk of the valve suffering from disturbances.

Normally, when the valve is used in a nuclear reactor plant, a safety circuit for operating the pilot valve is provided. When such a safety circuit is used in addition to the scram valve, the scram valve response time to a line rupture is shorter than when, as has previously been the usual case, the closing movement of the scram valve is triggered by way of the safety circuit since the pilot valve piston is acted on directly.

The invention is of use both for scram valves whose pistons are operated by an external pressure medium and for scram valves whose pistons are operated by own medium, i.e. by the medium flowing through the scram valve. In the latter case, the upstream end of the pressure medium supply line connected to the cylinder sub-chamber which is operative in the closing movement is connected to the scram valve casing upstream of the valve seat. Closing times are very short in the case of own-medium-operated scram valves since no long lines are necessary.

Advantageously, a line is connected to the outlet spigot so that the pressure operative near the scram valve outlet spigot may be operative on the pilot valve piston. The advantage of this feature is that the system embodied by the scram valve, pilot valve and associated lines can be tested for operation quite simply before being fitted into a plant.

These and other objects and advantages of the invention will become more apparent from the following detailed description and appended claims taken in conjunction with the accompanying drawing in which:

The drawing illustrates a cross-sectional view of a scram valve according to the invention.

Referring to the drawing, a shell 1 of a nuclear power plant encloses a scram valve 2 which is incorporated in a line 70, 70' e.g. a live steam line extending from a nuclear reactor (not shown) to a turbine (not shown) disposed outside the shell 1. The scram valve 2 mainly comprises a valve casing 3 having an inlet spigot 4, an exit or outlet spigot 5, a valve seat 7 formed in the casing 3 between the spigots 4, 5 and a valve body 8 which cooperates with the valve seat 7. The valve body or head 8 is connected by way of a piston rod 9 to a means such as a piston head 11 which is movable in a lid 10 on the casing 3 which defines a cylindrical chamber. The piston head 11 serves to sub-divide this chamber into a pair of sub-chambers 13, 14. The sub-chamber 13 disposed above the piston head 11 as shown is operative upon closure of the valve 2. A pressure medium supply line 16, 17 is connected to the chamber 13 to supply a pressure medium to the chamber 13 from the casing 3 upon closing of the valve 2. The sub-chamber 14 disposed below the piston head 11 as viewed communicates by way of a line 19, 40 with a low-pressure chamber 41. The pressure in this chamber 41 is below atmospheric pressure. The chamber 41 communicates e.g. with a condenser (not shown) for the turbine (not shown). The piston rod 9 is recessed towards the chamber 13 and houses a compression spring 15 which bears on a cover of the lid 10 to bias the valve body 8 toward a closed position on the valve seat 7.

A pilot valve 20 comprises a casing 21 and a control piston 22 which moves in the casing 21. This control piston 22 has an enlarged head 30 at the bottom end which moves in a cylinder 23 of the casing 21. A means such as a line 18 is connected to the underside of the cylinder 23 to communicate the piston head 30 by way of a magnet valve 47 and a check valve 49, with the flow of medium in the casing 3 near the scram valve outlet spigot 5. At the top of the piston head 30, the control piston 22 has an annular collar 31 which cooperates with a seat 31' in the casing 21 while the line 17 extends from the casing 3 to the top end of the cylinder 23 above the piston head 30.

As shown, the line 17 connects via a passage 24 in the casing 21 the upstream end of the line 16 to the casing 3 upstream of the valve seat 7 and, thus, serves to communicate the line 16 with the flow of medium in the casing 3. Thus, when the collar 31 is in a closed position, the supply of pressure medium from the casing 3 is shut-off.

A check valve 45 is disposed in the line 17 to prevent any flow of medium towards the casing 3. The collar 31 merges upwardly into a rod 32 which, in turn, merges into a collar 33 cooperating with a seat 33'. The passage or bore 24 extends between the seats 31' and 33', and also extends around the rod 32 at a radial distance therefrom. The seat 33' merges upwardly into a cylindrical widened part 25 to which the line 40 to the low-pressure chamber 41 is connected. The collar 33 is prolonged upwards and cooperates with a passage 26 in the casing 21 to form a guide for the control piston 22 of the pilot valve 20. The upwards prolongation or extension of the collar 33 is recessed at the top and receives a compression spring 35 which bears on the casing 21 on the top end of the passage 26. Also, the passage receiving the spring 35 communicates via a radial passage 36 with the cylindrical widened part 25.

A line 50 is connected between the line 18 and a connecting line 51 extending between the low pressure chamber 41 and a high-pressure chamber 55. As shown, the line 50 branches off from the line 18 between the cylinder 23 and the valve 47. The pressure in the chamber 55 is somewhere between atmospheric pressure and the pressure of the live steam in the line 70, 70'. The line 51 has a magnetic valve 56, 57 disposed one each on both sides of the place where the line 50 joins the line 51. A restrictor 58 can be provided between the valve 57 and the high pressure chamber 55, and a restrictor 48 can be provided between the valve 47 and check valve 49. In addition, a safety circuit can be connected to the valves 47, 56, 57 to close each in response to a predetermined instruction signal.

The scram valve operates as follows:

When the plant is operating normally, the scram valve 2 is in the open position illustrated. The pilot valve 20 is also in the position illustrated, in which position the seat 31' is in the closed state and the seat 33' is open. Live steam flows from the reactor through line 70 into the valve casing 3 and therefrom through outlet 5 and line 70' to the turbine. The cylinder chambers 13, 14 above and below the piston head 11 of the valve body 8 communicate via lines 16, 40 and 19, 40 respectively with the low-pressure chamber 41.

The live steam pressure operative on the valve body 8 keeps the scram valve in the open position shown, against the force of the compression spring 15. The control piston 22 of the pilot valve 20 experiences the force of the spring 35 and the effect, which overcomes the force of spring 35, of the pressures operative on piston head 30. The valve 47 is open and the valves 56, 57 are in the closed state. The biasing of the spring associated with the check valve 49 is such that the valve 49 opens only when the pressure drop across it is slightly greater than the pressure difference normally existing between the place where line 17 is connected to the casing 3 and the place where line 18 is connected to the outlet spigot 5. Consequently, in steady-state conditions, the pressure which arises in the cylinder 23 above and below the piston head 30, because of the leakage occuring thereat, is the high pressure less the pressure drop across the check valve 45 which exists in the valve casing 3 upstream of the valve seat 7. The force of the compression spring 35 is therefore opposed by a resultant pressure of a magnitude substantially equal to the product of the circular area bounded by the actual sealing line of collar 31 times the difference between, on the one hand, the pressure in line 17 between check valve 45 and pilot valve 20 and, on the other hand, the pressure in chamber 41. The spring 35 is so devised that in normal operating conditions its biasing is always less than the resultant pressure just referred to.

In the event of a rupture occuring in the line 70' extending to the turbine, with a consequent abrupt pressure decrease, the check valve 49 opens and the cylinder chamber 23 below the piston head 30 discharges by way of the open valve 47. Since the original live steam pressure still acts above the piston 30 because of the check valve 45, the piston 22 of pilot valve 20 descends abruptly so that the collar 31 opens the seat 31' while the collar 33 engages with the seat 33'. Live steam now flows from line 17 through the passage 24 in the pilot valve 20 and through line 16 to the cylinder chamber 13 above the piston 11. Consequently, and boosted by the compression spring 15, the scram valve body 8 moves abruptly into the closed position. When the piston 22 makes the downwards movement in the manner described, an adiabatic expansion occurs, with the result of a pressure reduction in the annular chamber above the piston head 30. This pressure reduction reduces the resultant of the pressures during the descent of the piston 22. To compensate for this pressure reduction, a storage capacity can be associated with the line 17 in the part thereof between the check valve 45 and the cylinder 23.

The valves 47, 56, 57 are connected to a safety circuit S which is adapted to respond to parameters other than the pressure. If the scram valve 2 is required to operate in response to a signal given by a human operator or to a closing signal given by the safety circuit S, the valve 56 is opened by a corresponding electrical signal so that the chamber below the piston head 30 is directly connected to the low-pressure chamber 41 via line 18. Consequently, the pressures acting on that zone of the piston 22 which is near its axis are maintained in equilibrium. The piston 22 is therefore moved into its bottom end position by the positive pressure operative in the annular chamber above the piston head 30, boosted by the effect of the spring 35. Thus, the top chamber 13 of the cylinder 10 communicates via lines 16, 17 with the scram valve casing 3. Thereafter, and as previously described, the scram valve 2 closes abruptly.

In other operating conditions, e.g. at starting, the scram valve 2 can be kept open by having the magnet valves 47, 56 closed and the magnet valve 57 opened, to enable the high pressure from the chamber 55 to act on the bottom of the piston head 30. The pressure raises the piston 22 so that the vlave 2 opens as soon as a pressure acting on the valve body 8 is available in the valve casing 3. To this end, after the valve 2 has been closed, the plant is shut down and, as a result, atmospheric pressure prevails in the line 70, 70'. However, since the pressure in the chamber 41 is below atmospheric pressure, so also, the pressures in the sub-chambers 13, 14 above and below the piston head 11 are below atmospheric pressure. Thus, the force of atmospheric pressure on the valve body 8, by exceeding the sum of the forces of the spring 15, the subatmospheric pressures in the chambers 13, 14 and the weight of the valve body 8, lifts the valve body 8 towards an open condition.

After the piston 22 of the control valve 20 has been lifted so that the collar 31 seals against the seat 31' and with the chamber 41 at the condensor pressure, the magnetic valve 47 is opened and the magnetic valve 57 is closed. The valve 2 is then in the operating condition. As the piston 22 rises, steam may discharge briefly from the casing 3 to the chamber 41 via line 17, seat 33' and line 40. If it is required to obviate any such discharge, line 40 can be provided with a valve which is closed during this transitional phase.

The pilot valve 20 with the lines 16-19 can be fitted on the valve casing 3 or fitted in a wall thereof. This feature, in addition to having the advantage of reducing the risk of the pilot valve 20 and lines 16-19 being destroyed, also provides the advantage that the lines are shorter, so that the scram valve operates even faster.

The valve 47 can be disposed outside the shell 1 although this feature would lead to an unsatisfactory lengthening of line 18. The diameter of pasage 26 in the casing 21 can be the same as the diameter of passge 24, in which event the collar 33 of the pilot valve 20 does not seat in the same way as a valve having a seat but as a spool having a land.

Through the agency of a three-way valve (not shown), line 19 can be selectively connected to line 40 or to the high-pressure chamber 55. This enables the scram valve 2 to be opened when no pressure is being applied by the medium to the valve body 8.

What is claimed is:

1. A scram valve comprising
a casing having an inlet spigot, an outlet spigot for a flow of medium and a valve seat between said spigots;
a movable valve body for seating on said valve seat to close said outlet spigot to the flow of medium;
a lid on said casing defining a cylindrical chamber;
a closing piston head slidably mounted in said cylinder chamber to sub-divide said chamber into a pair of subchambers;
a rod connecting said piston head to said valve body;
a pressure medium supply line connected between said casing and one of said sub-chambers to deliver a pressure medium thereto from said casing for moving said valve body into closing relation with said outlet spigot;
a low pressure chamber connected to the other of said sub-chambers;
a pilot valve in said pressure medium supply line for selectively opening and closing said supply line to said casing, said pilot valve including a control piston and a line communicating one end of said control piston with the flow of medium in said casing near said outlet spigot whereby said latter piston moves into an opening position in said supply line in response to an abrupt pressure decrease downstream of said valve seat to allow the pressure medium in said supply line to flow into said one sub-chamber to cause said valve body to seat on said valve seat;
a line connected between said outlet spigot and said end of said control piston;
a check valve permitting a flow only towards said outlet spigot in said line between said outlet spigot and said pilot valve;
a second line connected between said low pressure chamber and said first line between said outlet spigot and said control piston, said second line being connected to said first line between said check valve and said control piston;
a third valve in said second line; and
a safety circuit connected to said third valve to operate said third valve in response to a predetermined instruction signal to connect said low pressure chamber to said first line.

2. A scram valve as set forth in claim 1 wherein said pressure medium supply line is connected at an upstream end to said casing upstream of said valve seat in communication with the flow of medium therein.

3. A scram valve as set forth in claim 1 wherein said low pressure chamber is maintained at a pressure below atmospheric and wherein a line connects said other sub-chamber with said low pressure chamber.

4. A scram valve as set forth in claim 1 wherein said control piston is double-acting and said pressure medium supply line communicates with an end of said control piston opposite said one end thereof whereby the pressure of the medium flowing through said casing upstream of said valve seat acts on said opposite end of said control piston.

5. A scram valve as set forth in claim 4 which further comprises a check valve permitting a flow only towards said pilot valve in said pressure medium supply line between said casing and said pilot valve piston.

6. A scram valve as set forth in claim 5 further comprising a storage means between said check valve and said pilot valve in said pressure medium supply line.

7. A scram valve as set forth in claim 1 wherein said check valve includes a spring wherein the biasing of said spring is so devised that the pressure drop across said check valve is approximately equal to the pressure drop which exists across said casing in normal operation.

8. A scram valve as set forth in claim 1 which further comprises a high pressure chamber, a third line connected between said high-pressure chamber and said second line, and a valve in said third line connected to said safety circuit to operate in response to a predetermined instruction signal.

* * * * *

UNITED STATES PATENT AND TRADEMARK OFFICE
CERTIFICATE OF CORRECTION

PATENT NO. : 4,129,141
DATED : December 12, 1978
INVENTOR(S) : Ernst Vogeli

It is certified that error appears in the above-identified patent and that said Letters Patent are hereby corrected as shown below:

Column 4, line 53, after "via" insert --the--

Column 4, line 68, change "vlave" to --valve--

Column 5, line 12, change "conditon" to --condition--

Column 5, line 31, change "pasage" to --passage--

Column 5, line 32, change "passge" to --passage--

Signed and Sealed this

Tenth Day of April 1979

[SEAL]

Attest:

RUTH C. MASON
Attesting Officer

DONALD W. BANNER
Commissioner of Patents and Trademarks